_United States Patent_ [19]

Peairs

[11] Patent Number: 4,607,874

[45] Date of Patent: Aug. 26, 1986

[54] AIR DEFLECTOR APPARATUS

[76] Inventor: Charles E. Peairs, 130 E. Jersey St., Gladstone, Oreg. 97027

[21] Appl. No.: 410,487

[22] Filed: Aug. 23, 1982

Related U.S. Application Data

[63] Continuation of Ser. No. 186,751, Sep. 12, 1980, abandoned.

[51] Int. Cl.⁴ .............................................. B60J 9/04
[52] U.S. Cl. ..................................... 296/1 S; 180/903
[58] Field of Search ......................... 296/1 S; 180/903

[56] References Cited

U.S. PATENT DOCUMENTS

| | | | |
|---|---|---|---|
| 3,947,065 | 3/1976 | Geiger | 296/1 S |
| 4,006,931 | 2/1977 | Groves | 296/1 S |
| 4,102,548 | 7/1978 | Kangas | 296/1 S |
| 4,206,942 | 6/1980 | Nudo et al. | 296/1 S |

FOREIGN PATENT DOCUMENTS 2833953  2/1980  Fed. Rep. of Germany ...... 296/1 S

Primary Examiner—John J. Love
Assistant Examiner—Ross Weaver
Attorney, Agent, or Firm—John P. Dellett

[57] ABSTRACT

An air deflector apparatus for trucks is adjustably moveable between a lower position substantially parallel to the top of a truck cab, and an upraised position providing streamlined flow of air up over the trailer. A pneumatic cylinder is employed and brace arms or struts operated thereby support the weight and force of the deflector such that the cylinder is not called upon to provide the supporting force.

6 Claims, 11 Drawing Figures

AIR DEFLECTOR APPARATUS

This is a continuation of application Ser. No. 186,751, filed Sept. 12, 1980, now abandoned.

BACKGROUND OF THE INVENTION

The present invention relates to air deflector apparatus for a vehicle and particularly to such apparatus which is remotely adjustable and can be maintained in the upraised position with minimum force.

Air deflectors are suitably mounted on the top of the cab of large diesel trucks for deflecting the flow of air up and over the top of the trailer being hauled. Such a deflector positioned in an angular manner on the top of the cab directs air in a streamlined fashion up toward the top of the trailer so that air will not sharply impinge upon the front end of the trailer causing excessive drag at high speeds. Deflectors of this type are generally mountable and demountable as a fixed unit which must be unscrewed from its mounting when it isn't needed, for instance when the tractor is traveling alone or is pulling a trailer with a low profile Some deflectors are adjustable between an upper position and lower position without necessitating complete removal of the unit. However, they require either manual adjustment at the top of the cab, or require a hydraulic cylinder or other operating mechanism suitable for raising and lowering the deflector and for bearing the weight of the deflector including the force of the oncoming airstream when the deflector is upraised.

SUMMARY OF THE INVENTION

In accordance with an embodiment of the present invention, an upraisable deflector shield is provided with first means for pivoting a forward portion thereof relative to the top of a vehicle, and brace arm means mounted rearwardly of the first means and pivotally connected to the shield for bracing the same in an upraised position. Controllable actuating means move the brace arm means between a first location where the shield is lowered toward the top of the vehicle and a second location where the weight of the shield including the force of the airstream thereagainst is shifted from the actuating means to said brace air means for bracing said weight directly against the vehicle. Thus, the shield is braced in its upward location and does not depend upon the actuating means to hold the same. Consequently, a relatively low priced pneumatic cylinder can be utilized which is operable from the air resrvoir of the vehicle.

In a preferred embodiment, the brace arm means comprise first and second struts respectively pivotally connected to the shield and to the top of the vehicle and pivotally connected to each other, wherein the actuating means operatively engages the pivotal connection between the first and second struts for moving the same between a first location where the struts define an angle therebetween of substantially less than 180° and a second location where the struts are more nearly aligned for bracing action. A torsion spring is suitably positioned between the shield and the top of the vehicle for assisting in raising the shield upwardly without requiring excessive force from the actuating means.

According to another embodiment, the brace arm means comprise struts pivotally connected at first ends relative to the shield and slidable at second ends relative to the tip portion of the vehicle, the actuating means being operatively connected to the second ends for moving the struts between first and second locations.

According to yet another embodiment of the present invention, the brace arm means comprise struts pivotally connected at first ends relative to said shield and pivotally connected at second ends relative to the top of the vehicle. The forward portion of the deflector shield is slidable as well as pivotable relative to the top portion of the vehicle and actuating means is operatively connected to the forward portion of the deflector shield for sliding and pivoting such forward portion while simultaneously moving the struts between first and second locations.

It is accordingly an object of the present invention to provide an improved air deflector apparatus for a vehicle which apparatus is remotely operable between a lowered position and a upraised position without requiring a heavy duty actuating means for holding the shield in the upraised position.

It is another object of the present invention to provide an improved, remotely adjustable air deflector apparatus for a vehicle which apparatus is economical in construction and operation.

It is another object of the present invention to provide an improved air deflector apparatus for a vehicle which apparatus is remotely adjustable between a lowered position and an upraised position and which is braced in the upraised position.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
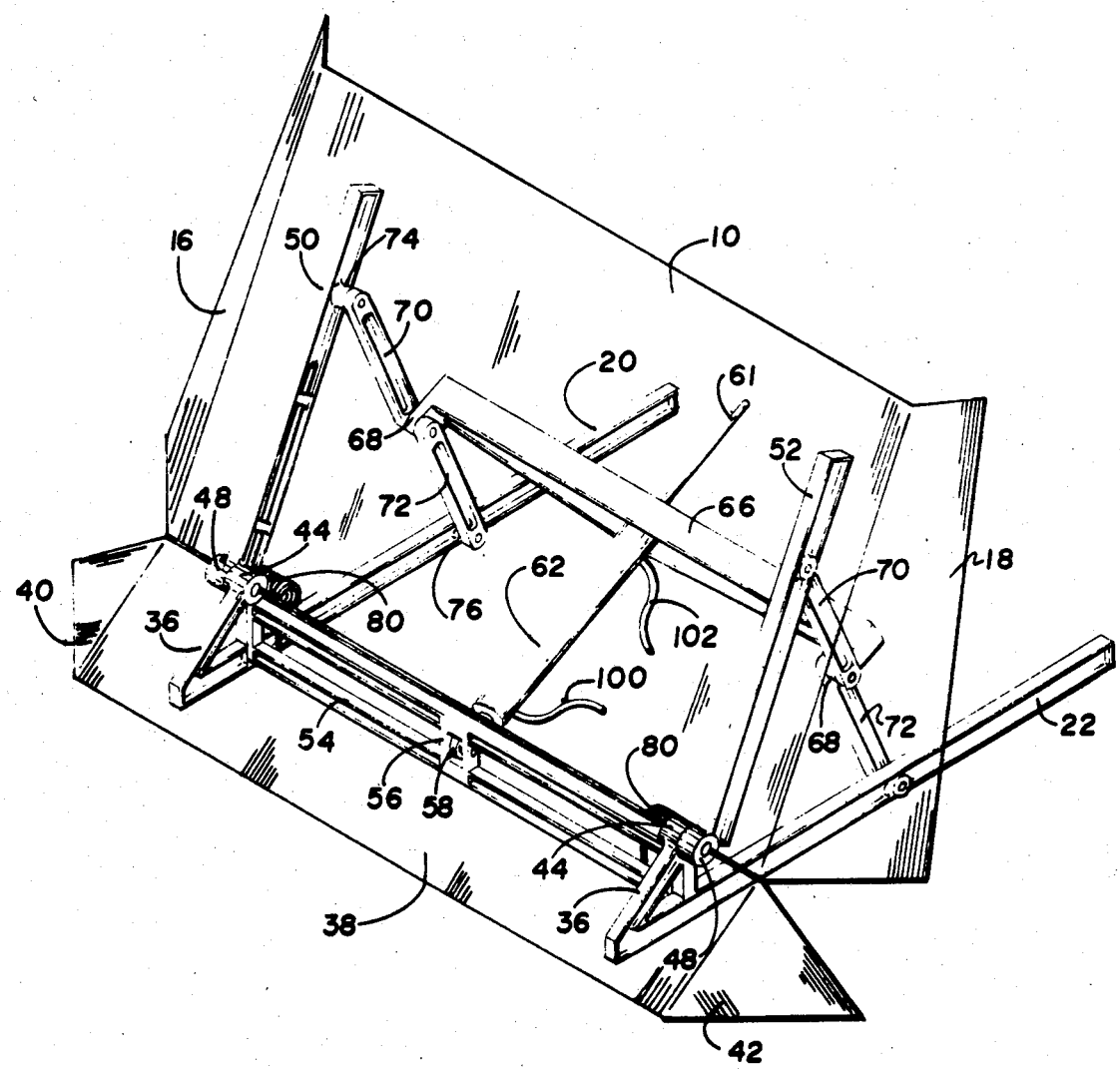
FIG. 1 is a perspective view of an air deflector apparatus accordingg to the present invention is an upraised position.
Figure 2:
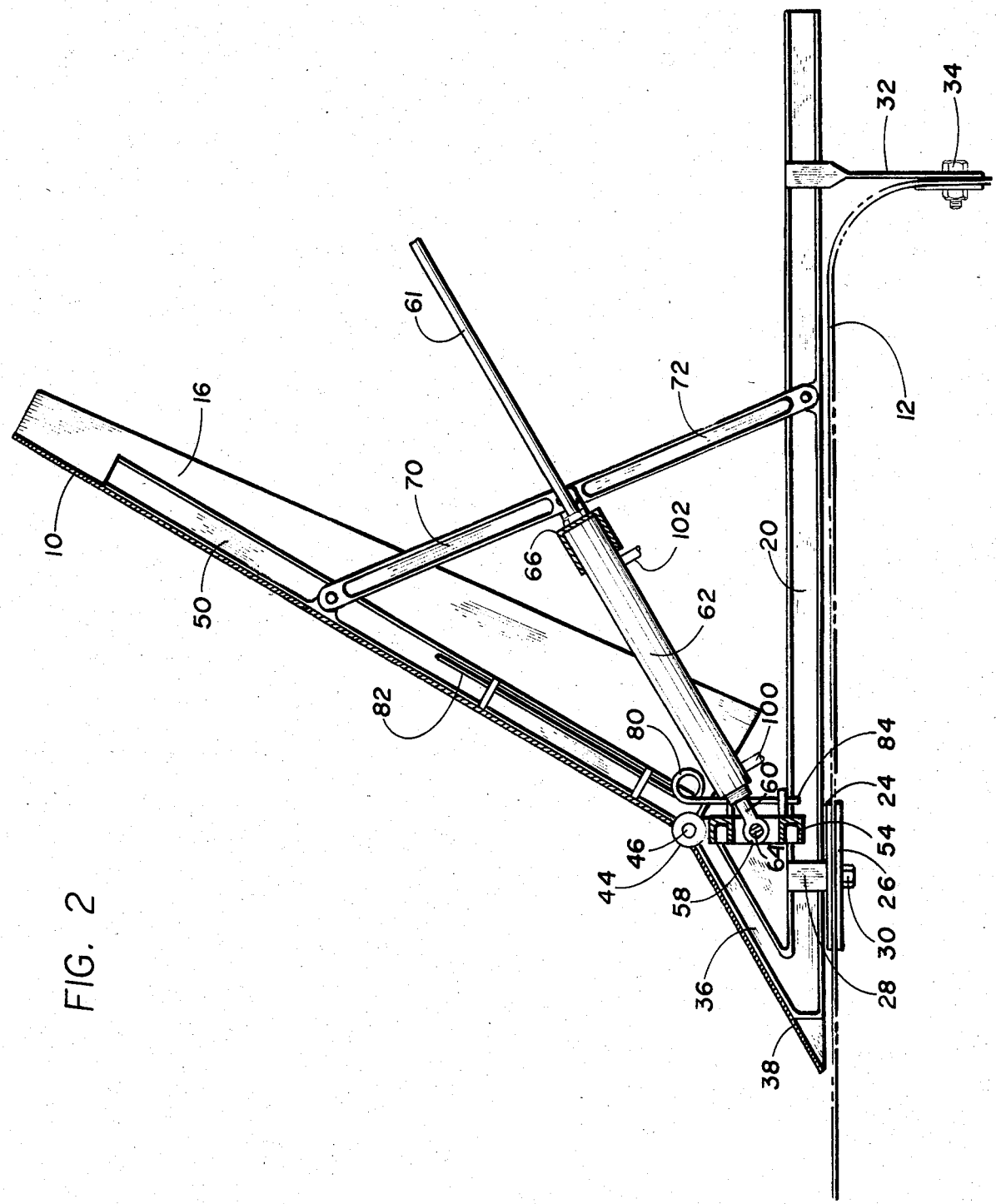
FIG. 2 is a longitudinal cross section of an air deflector apparatus according to the present invention in an upraised position.
Figure 9:
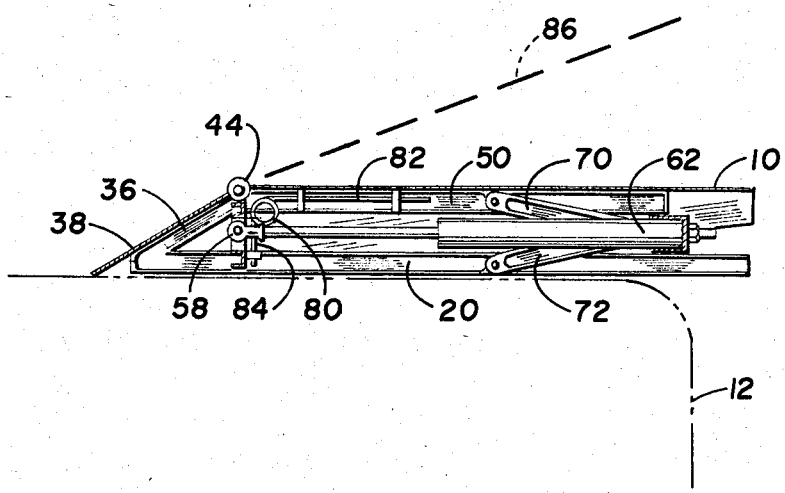
FIG. 9 is a longitudinal cross-sectional view of air deflector apparatus according to the present invention in a retracted or lowered position.

Referring to the drawings and particularly to FIGS. 1, 2, and 9 illustrating a first embodiment of the present invention, a deflector shield 10 is adapted for mounting on the top surface or roof of a vehicle cab 12. The vehicle cab will generally form part of a tractor employed for pulling a trailer as indicated at 14 in FIG. 3.

The deflector shield 10 is suitably formed of a sheet of flat material which is shown as clear plastic in FIG. 1 for purpose of illustrating the operating mechanism therebeneath, it being understood the material may comprise opaque plastic fiberglass, sheet metal or the like. The width of the shield 10 is preferably more than half the width of the cab, while the height thereof is suitably about tow-thirds to three-fourths the width. The deflector shield is provided with side wings 16 and 18, formed of the same material, which angle backwardly from the deflector shield when the deflector is in a position as illustrated at FIGS. 1 and 2.

The mechanism for operating the shield, i.e. lowering and raising the same, comprises a pair of horizontally disposed support rails 20 and 22 which are suitably fastened to the top of the cab by means of mounting plates 24 and 26 disposed respectively outside and inside the cab. The plates are secured together and to a guide 28, engaging one of the rails, by means of a bolt 30. It will be understood that at least two such fastening means will be employed, one for each support rail, and possibly four may be employed with two securing each support rail to the top of the cab. In the embodiment as shown in FIG. 2, one such support means is employed for each support rail, and an end mount 32 is attached rearwardly to each rail and is secured to the rear of the cab via a bolt 34.

The forward end of each of the rails 20, 22 includes an A-frame portion 36 across which a lower shield extension or skirt 38 is disposed, said skirt having side extensions 40 and 42 flaring rearwardly. The top of each of the A-frame extensions 36 is provided with a bearing hub 44 receiving a pin 46 also pivotally engaging bearing members 48 attached to the forward ends of upper parallel support rails 50 and 52. The shield 10 is secured as with screws (not shown) to the upper support rails 50 and 52, and these upper support rails rearwardly of the A-frame sections are suitably about the same length as the lower support rails. The rails 20, 22, 50 and 52 have generally I-beam shaped cross sections and are formed of metal, as are the remaining portions of the operating mechanism.

A generally H-shaped front cross member 54 is joined to rails 20 and 22 and extends perpendicularly therebetween. A central vertical leg 56 thereof has an aperture for receiving a spherical ball end connection 58 on the rod 60 of a double acting pneumatic cylinder 62. A pin 64 secures the spherical ball end connection to the leg 56 on either side of the aperture thereof. The opposite end of cylinder 62 is received within and joined to movable, channel-shaped cross member 66 which is somewhat tapered or widened at the center in order to receive the end of the cylinder 62. The end 61 of rod 60 also extends through an aperture in the cross member 66.

Each end of cross member 66 is provided with a lug 68 receiving a pin which is pivotally joined to struts 70 and 72, the remote ends of which pivotally join rails 50 and 20 or rails 52 and 22. The upper rails are provided with bearing bosses 74 suitably located nearly two-thirds the way up the rails and each having a pin which extends through the upper end of a strut 70, while the lower rails are provided with similarly located bearing bosses 76 each having a pin which is pivotally connected to the lower end of a strut 72.

It will be observed that actuation of the air cylinder 62 moves cross member 66 rearwardly or forwardly with respect to cross member 54 thereby causing movement of struts 70 and 72 between the position illustrated in FIG. 9. wherein the shield 10 is lowered toward the top of the cab and the struts include an angle therebetween of substantially less than 180°, and the position illustrated in FIGS. 1 and 2 wherein struts 70 and 72 are substantially aligned, having an angle therebetween of approximately 180°. For the positioning illustrated in FIGS. 1 and 2, it is seen the struts 70 and 72, which together provide a brace arm means, brace the shield 10 against the rails 20 and 22 and the top of the cab without requiring an energizing force from pneumatic cylinder 62. Thus, the force of the oncoming airstream toward the deflector 10, and the weight of the deflector, is borne directly through the struts 70 and 72 as a brace, and gusts of wind or the like will not cause up and down movement of the deflector shield against the pneumatic pressure in cylinder 62.

The mechanism is further suitably provided on each side thereof with a coil torsion spring 80 disposed proximate the forward pivot point of the shield, i.e. near bearing member 44, 48 and having legs 82 and 84 located along the upper rails and the front cross member 54 respectively where these legs are secured by supports. With the weight of the deflector shield, the at-rest position thereof against spring pressure is illustrated in FIG. 9 by dashed line 86. Thus, for the first location of the shield when it is lowered toward the top of the vehicle, cylinder 612 must positively urge the same downwardly against spring pressure. The spring means is used initially to lift the shield 10 since, as will be recognized, the cylinder 62 has less mechanical advantage with the shield entirely down than it does in a somewhat upraised position. consequently, a smaller cylinder 62 is usable for raising the shield from position 86 to the completely upraised and braced position as illustrated in FIGS. 1 and 2.

Figure 6:
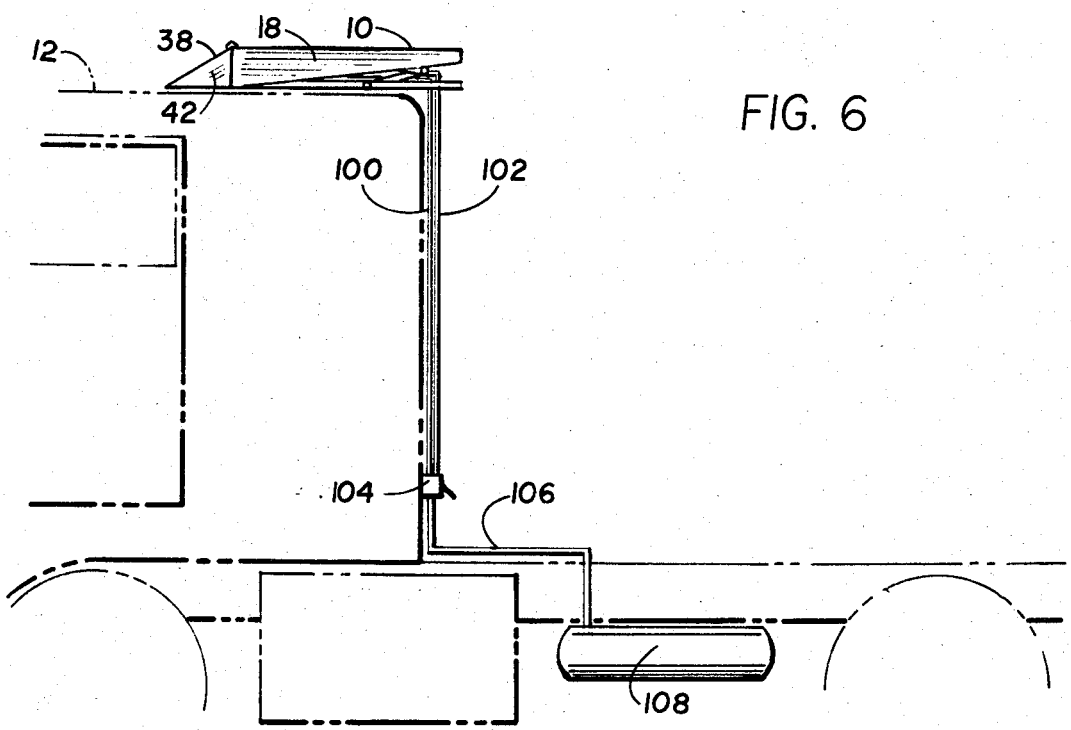
FIG. 6 is a side view of air deflector apparatus according to the present invention as connected to the air supply of a truck for disposing the deflector apparatus in a lowered position.

The reason for providing the forward skirt 38 is more clearly seen in FIG. 6 wherein the shield 10 is lowered. It will be seen that the skirt 38 together with it side wings such as wing 42, and shield 10 with its side wings such as side wing 18 completely enclose the operating mechanism and allow passage of the airstream thereover rather than thereunder.

Figure 3:
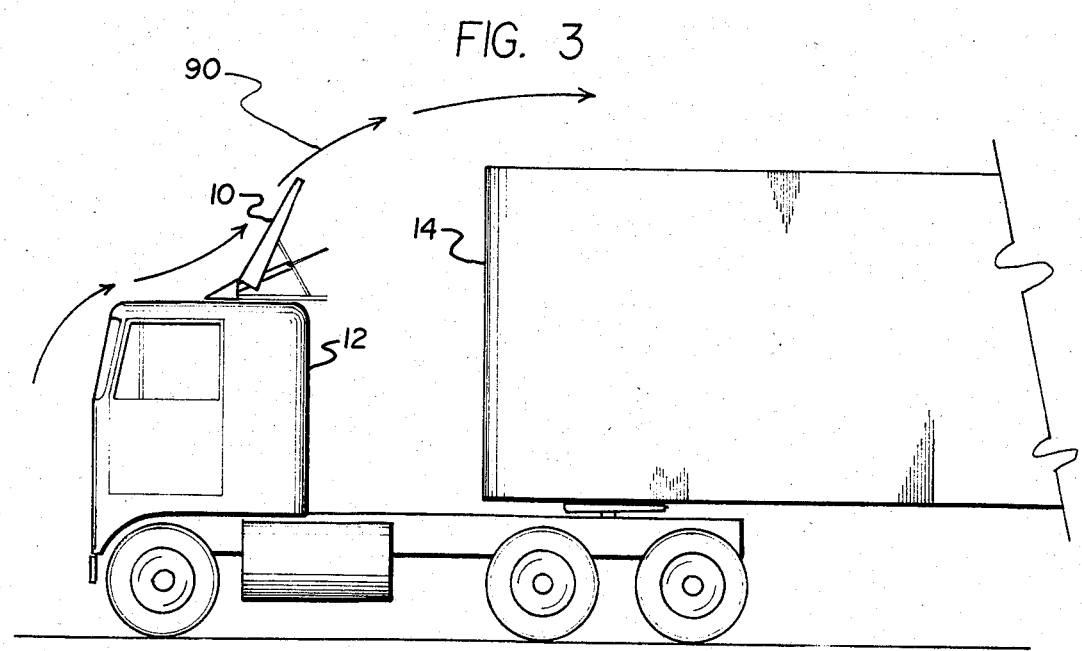
FIG. 3 is a side view, partially broken away, of a truck tractor and trailer illustrating operation of the air deflector according to the present invention in its upraised position.
Figure 4:
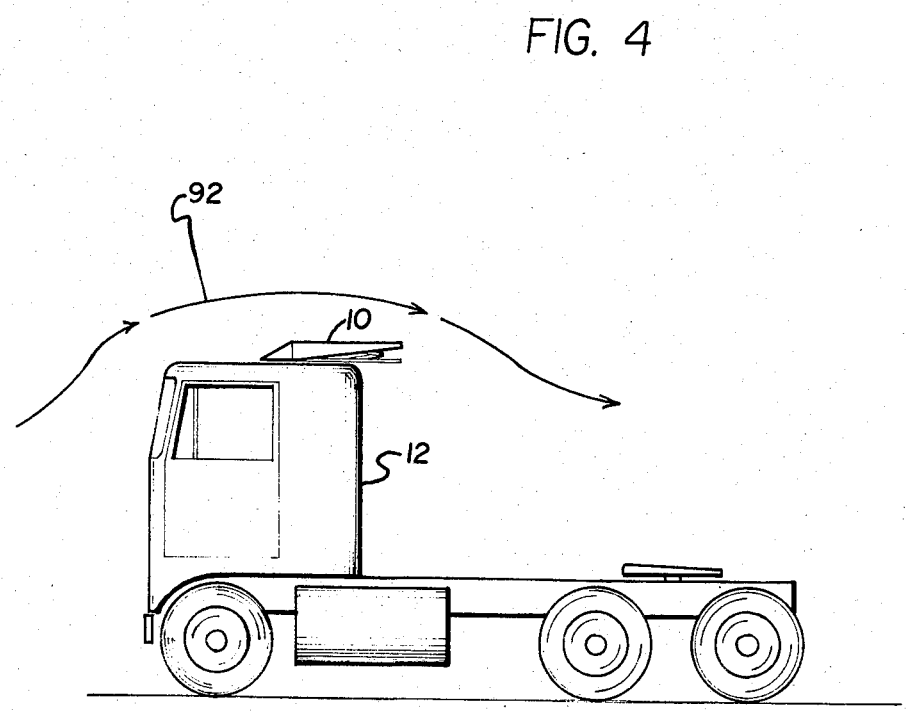
FIG. 4 is a side view of a truck tractor employing the air deflector apparatus according to the present invention wherein such apparatus is illustrated in its retracted or downward position.
Figure 7:
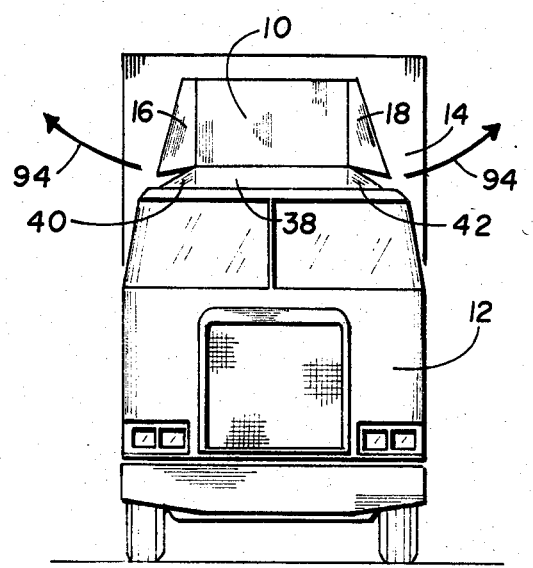
FIG. 7 is a forward view of a truck employing a deflector apparatus according to the present invention.

For the upraised position of the shield 10, the stream of air tends to flow past the cab 12, the shield 10 and the trailer 14 as illustrated by arrows 90 in FIG. 3. When the tractor has no trailer, or a substantially smaller trailer such as a flatbed, the shield 10 is conveniently lowered to the position illustrated in FIG. 4 whereby the airstream can pass over the cab as illustrated by arrows 92 in FIG. 4. For the upraised position, the wings 16 and 18 of the main shield causes the air to flow around the trailer 12 as indicated by arrows 94 in FIG. 7, as aided by wings 40 and 42 of skirt 38.

Figure 5:
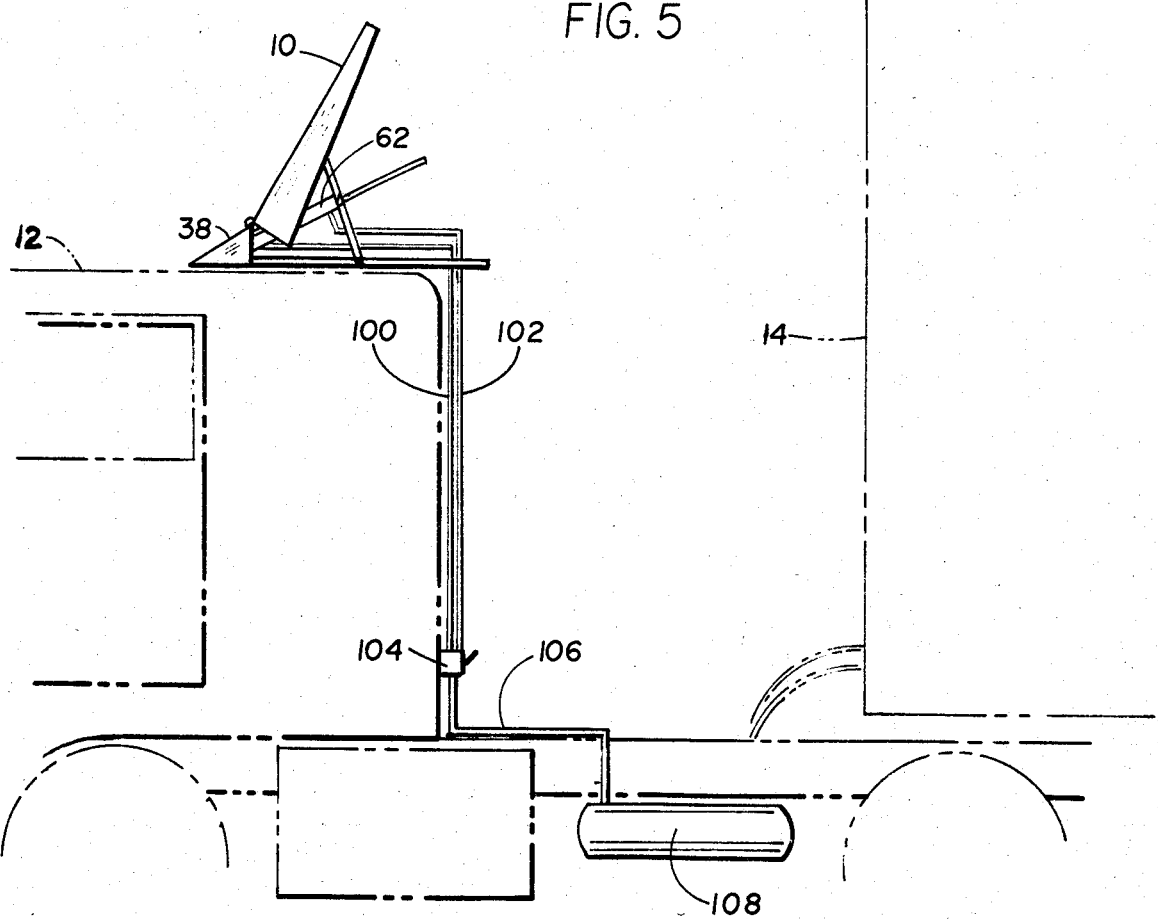
FIG. 5 is a side view of air deflector apparatus according to the present invention as connected to the air supply of a truck for disposing the deflector apparatus in the upraised position.
Figure 8:
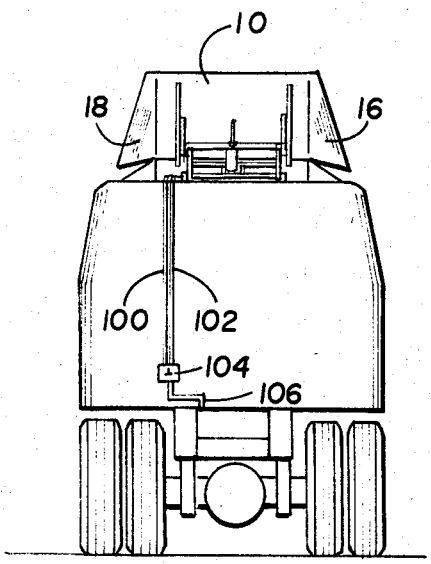
FIG. 8 is a rear view of a truck tractor employing an air deflector apparatus according to the present invention.

The air lines 100 and 102 connected to either end of air cylinder 62 are suitably connected to an air supply as illustated in FIGS. 5, 6 and 8. The lines 100 and 102 can be extended down the rear of the cab (as illustrated in FIG. 8) to a pneumatic valve or switch 104 having a common air supply line 106 leading to the truck's air reservoir 108 as employed for braking and the like. The valve or switch 104 directs air pressure to either line 100 or 102, meanwhile venting the opposite line, for moving the actuating rod of the pneumatic cylinder in correspondingly raising or lowering the shield. Valve or switch 104 desirably has a neutral position wherein both lines 100 and 102 are sealed off but neither is provided air pressure from supply 108. Consequently, the shield can be moved to an intermediate position and held there if so desired, although it is generally preferred to move between a fully lowered position and the fully raised position.

Figure 10:
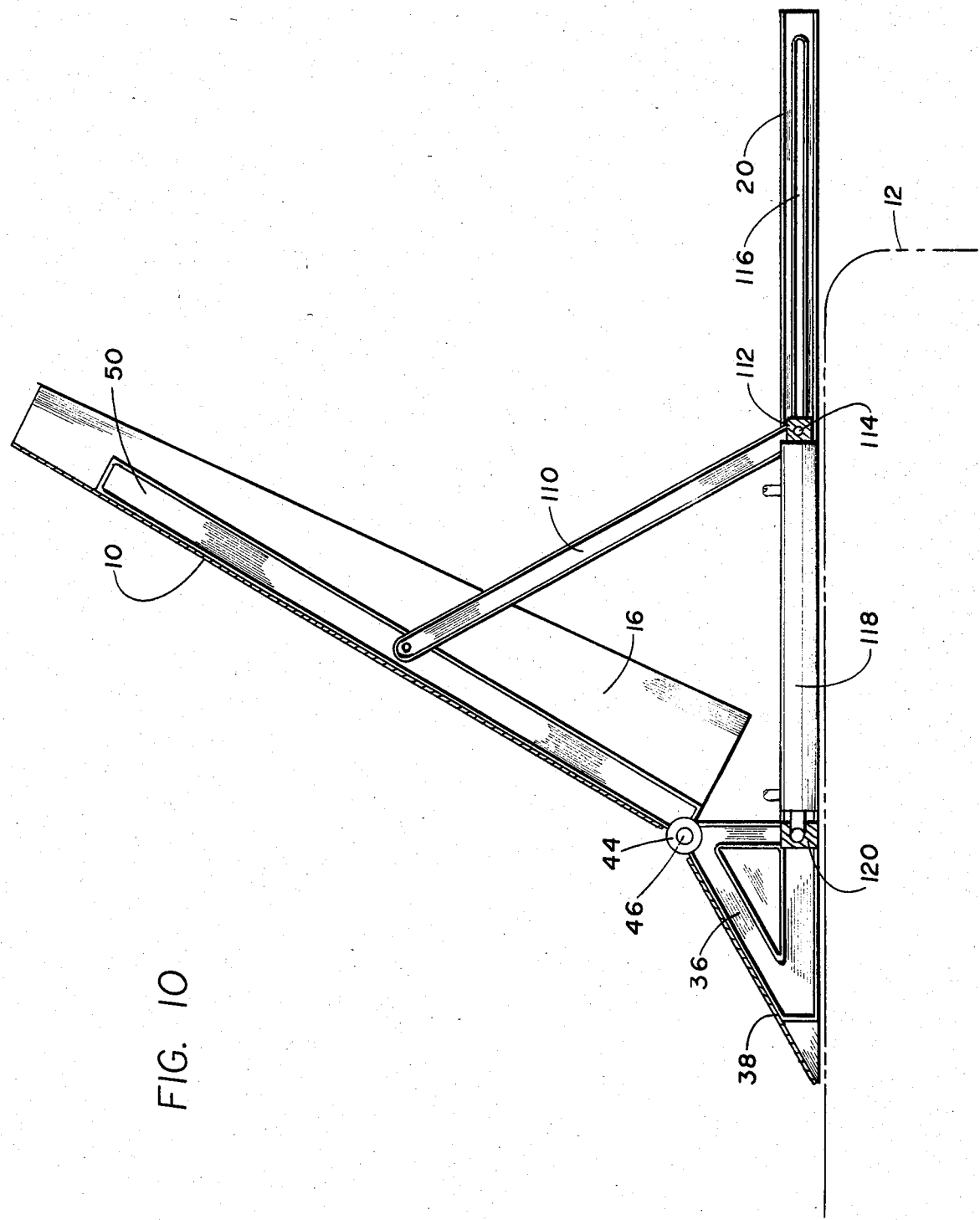
FIG. 10 is a longitudinal cross-sectional view of air deflector apparatus according to an alternative embodiment of the present invention.

Referring to an alternative embodiment of the present invention as illustrated in FIG. 10 wherein similar elements are indicated by the same reference numerals, rails 50 supporting shield 10 are pivotally attached about midway therealong to brace arm means comprising struts 110 (one at each side of the device) pivotally connected to a lower cross bar 112 having end pins 114 slidable in slots 116 of horizontal rails 20. A pneumatic cylinder 118 is horizontally disposed between movable cross bar 112 and forward cross bar 120 located between A-frame portions 36 of the lower support rails. It will be seen that actuation of the pneumatic cylinder 118 slides cross bar 112 along slots 116 for raising and lowering the shield 10. It will be seen that in the upraised position, the struts 110 substantially support the weight of the shield 10 without material assistance from pneumatic cylinder 118. However, the embodiment of FIGS. 1, 2 and 9 is preferred because the bracing support is somewhat firmer and operation easier.

Figure 11:
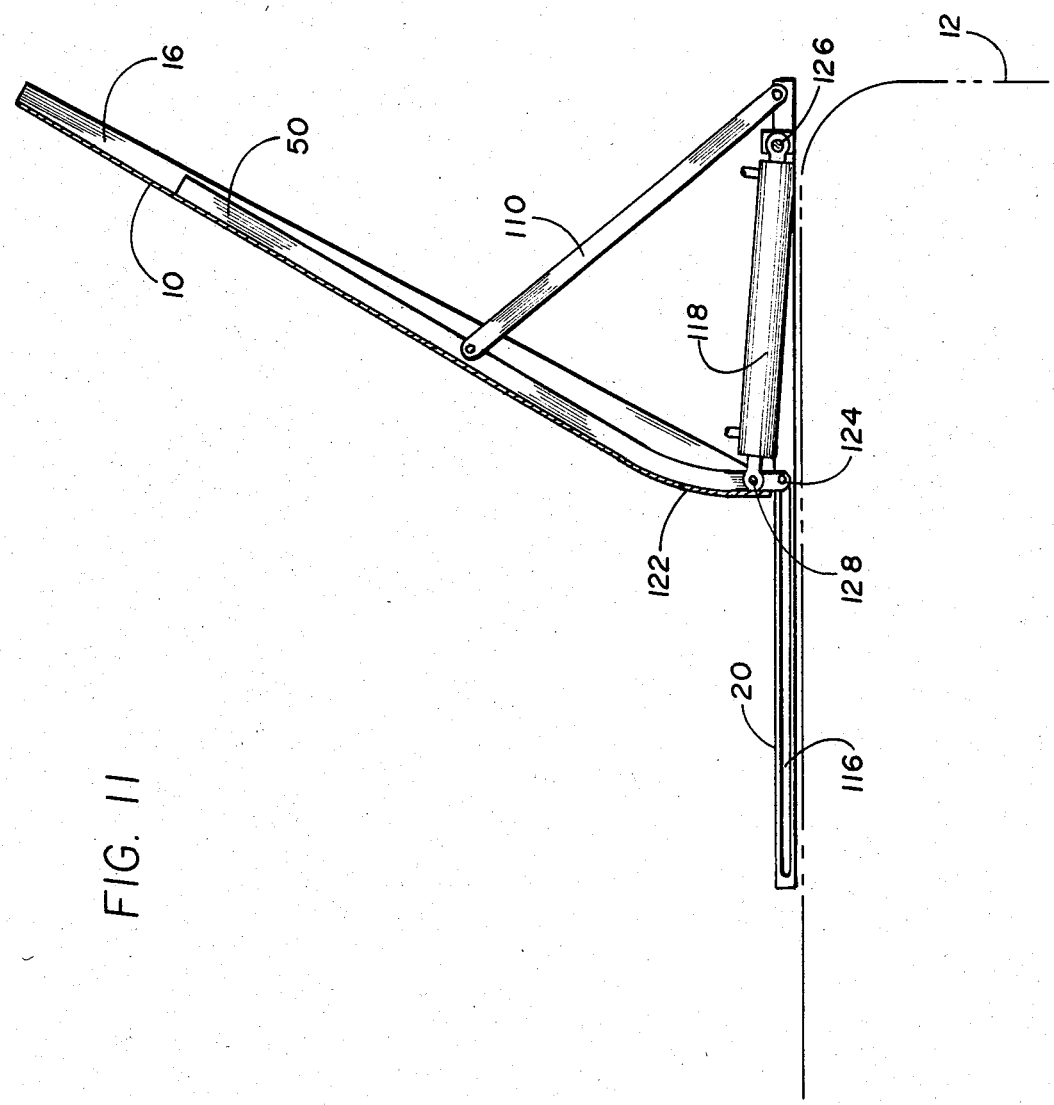
FIG. 11 is a longitudinal cross-sectional view of air deflector apparatus according to yet another alternative embodiment according to the present invention.

A yet further embodiment of the present invention is illustrated in FIG. 11 wherein like elements are again referenced with like reference numerals. In this embodiment, shield 10 joined to rails 50 is curved inwardly and downwardly at 122 towards pins 124 which slide in slots 116 of lower horizontal rails 20 while pneumatic cylinder 118 is pivotally interposed between a rearward cross member 126 extended between lower rails 20 and a forward pivot rod 128 joining the lower forward ends of rails 50. Struts 110 are pivotally connected between the rearward ends of rails 20 and points approximately midway along rails 50. It will be seen that actuation of pneumatic cylinder 118 slides the lower forward end of shield 10 along the rails 20 between the upraised position shown and a lowered position wherein the forward lower end of the shield is moved to the left. Struts 110 substantially support the shield in the upward position, and wind pressure from the left in the FIGURE tends to assist in holding the shield in the upraised position. Bracing support is again substantially directly along struts 110 whereby constant pressure from pneumatic cylinder 118 is not required. However, again the embodiment of FIGS. 1 and 2 is preferred inasmuch as it provides smoother operaion and better bracing support.

It will be noted that in the embodiment of FIG. 11, the forward lower portion 122 of the shield 10 is curved downwardly to enclose the operating mechanism in a streamlined manner when the shield is folded downwardly against the cab.

Although pneumatic cylinder means is illustrated as an actuating means for the apparatus according to the present invention and is preferred because of the economy thereof and inasmuch as the disclosed construction enables actuation by a pneumatic cylinder, nevertheless a hydraulic cylinder or mechanical or electro-mechanical screw means or the like may be substituted if so desired.

While I have shown and described several embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I calim:

1. An air deflector apparatus for a vehicle, said apparatus comprising:

an upraisable deflector shield having a surface area adapting the same to deflect an oncoming airstream up and over said vehicle as the vehicle moves forwardly, first means for pivoting a forward portion of said deflector shield relative to a top portion of said vehicle, brace arm means mounted rearwardly of said first means and pivotally connected to said shield for bracing the same in an upraised position, and controllable actuating means comprising a pneumatic cylinder for changing the relative positions of said shield and said brace arm means for moving said brace arm means between a first location wherein said shield is lowered toward the top of said vehicle and a second location defining a direct bracing position wherein the weight of said shield including the force of the airstream thereagainst is shifted from said actuating means to said brace arm means for bracing said weight directly against the top portion of said vehicle, wherein said brace arm means comprise first and second struts respectively pivotally connected to said shield and the top of said vehicle as well as pivotally connected to each other, third and fourth struts respectively pivotally connected to said shield and the top of said vehicle as well as pivotally connected to each other, and cross means joining the pivotal connection between the first and second struts and the pivotal connection between the third and fourth struts, said actuating means being disposed substantially between the pivoting axis of said first pivoting means and said cross means for moving the struts between a said first location wherein the first and second struts define an angle therebetween and the third and fourth struts define an angle therebetween of substantially less than 180°, and a said second location wherein said struts are more nearly aligned, the pivotal connection between said struts in said first location being farther away from said first pivoting means than when in said second location such that said struts fold away from said first pivoting means in said first location providing access for said actuating means between said cross member and the pivoting axis of said first pivoting means.

2. The apparatus according to claim 1 wherein said first means for pivoting is upraised relative to the top portion of said vehicle, and a forward shield extension is provided between said shield and the top portion of said vehicle.

3. The apparatus according to claim 1 also including spring means for urging said shield upwardly.

4. The apparatus according to claim 3 wherein said spring means comprises a coil torsion spring located proximate the pivot of said shield relative to the top protion of said vehicle.

5. The apparatus according to claim 1 wherein said actuating means comprises a double acting pneumatic cylinder.

6. An air deflector apparatus for a vehicle, said apparatus comprising:
   an upraisable deflector shield having a surface area adapting the same to deflect an oncoming airstream up and over said vehicle as the vehicle moves forwardly,
   first means for pivoting a forward portion of said deflector shield relative to a top portion of said vehicle,
   brace arm means mounted rearwardly of said first means and pivotally connected to said shield for bracing the same in an upraised position,
   and controllable actuating means for changing the relaitve positions of said shield and said brace arm means for moving said brace arm means between a first location wherein said shield is lowered toward the top of said vehicle and a second location wherein the weight of said shield including the force of the airstream thereagainst is shifted from said actuating means to said brace arm means for bracing said weight directly against the top portion of said vehicle, said actuating means comprising a double acting pneumatic cylinder,
   whereing said brace arm means comprise first and second struts respectively pivotally connected to said shield and the top of said vehicle toward a first side of said vehicle and pivotally connected to each other, and third and foruth struts respectively pivotally connected to said shield and the top of said vehicle toward a second side of said vehicle opposite said first side and pivotally connected to each other,
   said apparatus further including a substantially horizontal cross member joining the pivotal connections between the first and second struts and between the third and fourth struts, and wherein said actuating means operatively engages said cross member and is substantially in line between said cross member and a location proximate the pivoting axis of said first pivotting means for moving said struts between a first position wherein the struts define an angle therebetween of substantially less than 180° and a second position wherein said struts are substantially aligned to provide bracing, the pivotal connection between said struts in said first position being farther away from said first pivoting means than in said second position such that said struts form a pantograph mechanism folding away from said first pivoting means in said first position providing access for said actuating means between said cross member and the pivoting axis of said first pivoting means,
   and torsion spring means located poximate the pivoting axis of said first pivoting means for urging said shield upwardly.

* * * * *

UNITED STATES PATENT AND TRADEMARK OFFICE
CERTIFICATE OF CORRECTION

PATENT NO. : 4,607,874

DATED : August 26, 1986

INVENTOR(S) : Charles E. Peairs

It is certified that error appears in the above-identified patent and that said Letters Patent is hereby corrected as shown below:

Column 1, line 45, "air" should be --arm--;

lines 50-51, "resrvoir" should be --reservoir--;

line 68, "tip" should be --top--.

Column 2, line 42, "accordingg" should be --according--.

Column 3, line 20, "purpose" should be --purposes--;

line 25, "tow" should be --two--.

Column 4, line 45, "612" should be --62--;

line 50, "consequently" should be --Consequently--;

line 56, "it" should be --its--;

line 65, "conventiently" should be --conveniently--.

Column 6, line 19, "calim" should be --claim--.

line 52, "foruth" should be --fourth--.

UNITED STATES PATENT AND TRADEMARK OFFICE
CERTIFICATE OF CORRECTION

PATENT NO. : 4,607,874  
DATED : August 26, 1986  
INVENTOR(S) : Charles E. Peairs It is certified that error appears in the above-identified patent and that said Letters Patent is hereby corrected as shown below:

Column 7, line 11, "protion" should be --portion--;

line 28, "relaitve" should be --relative--.

Column 8, line 3, "whereing" should be --wherein--;

line 7, "foruth" should be --fourth--;

line 19, "pivotting" should be --pivoting--;

line 32, "poximate" should be --proximate--.

Signed and Sealed this

Twenty-fourth Day of March, 1987

Attest:

DONALD J. QUIGG

Attesting Officer      Commissioner of Patents and Trademarks